United States Patent [19]
Tsuchiya et al.

[11] Patent Number: 5,256,956
[45] Date of Patent: Oct. 26, 1993

[54] POWER SUPPLY APPARATUS FOR AUTOMOTIVE VEHICLES

[75] Inventors: Yoshinobu Tsuchiya, Fujisawa; Ken Kurabayashi, Chigasaki; Hiroyoshi Moroboshi, Yokohama, all of Japan

[73] Assignee: Isuzu Motors Limited, Tokyo, Japan

[21] Appl. No.: 776,882

[22] Filed: Oct. 17, 1991

Related U.S. Application Data

[63] Continuation of Ser. No. 652,485, Feb. 8, 1991, abandoned, which is a continuation of Ser. No. 454,257, Dec. 21, 1989, abandoned.

[30] Foreign Application Priority Data

Dec. 27, 1988 [JP]   Japan ............................. 63-329846

[51] Int. Cl.$^5$ ................................................ H02J 7/00
[52] U.S. Cl. .......................................... 320/15; 320/61
[58] Field of Search ................... 320/1, 2, 6, 15, 61, 320/62, 63, 64

[56]        References Cited
         U.S. PATENT DOCUMENTS

| | | | |
|---|---|---|---|
| 2,729,750 | 1/1956 | Draper et al. | 320/15 X |
| 2,979,551 | 4/1961 | Pack | 320/61 X |
| 3,949,289 | 4/1976 | Day | 320/15 X |
| 4,161,684 | 7/1979 | Ragaly | 320/15 X |
| 4,345,197 | 8/1982 | Wheadon et al. | 320/61 X |
| 4,348,628 | 9/1982 | Loucks | 320/61 |

Primary Examiner—Kristine L. Peckman
Attorney, Agent, or Firm—Staas & Halsey

[57] ABSTRACT

A power supply apparatus for an automotive vehicle having a storage battery and a large-capacity capacitor charged by the storage battery. When the engine is started, an engine starter is driven by the electric charge stored in the large-capacity capacitor.

7 Claims, 3 Drawing Sheets

BATTERY DISCHARGE CHARACTERISTIC

26AH BATTERY
DISCHARGE CURRENT : 150 A

BATTERY CHARGING CHARACTERISTIC

26AH BATTERY
BATTERY VOLTAGE 14.5 V

001
POWER SUPPLY APPARATUS FOR AUTOMOTIVE VEHICLES

This application is a continuation of application Ser. No. 07/652,485, filed Feb. 8, 1991, abandoned which is a continuation of application Ser. No. 07/454,257, filed Dec. 21, 1989, abandoned.

BACKGROUND OF THE INVENTION a. Field of the Invention

This invention relates to an improved vehicular power supply apparatus for an automotive vehicle which serves as the power supply of an engine starter when the engine is started.

b. Description of the Related Art

A lead storage battery for an automotive vehicle serves as the power supply of the engine starter and other electrical loads such as the auxiliary equipment of the vehicle. When the engine is started, the lead storage battery supplies the starter with a large current on the order of, say, 100~200 A for a short period of time. The engine crankshaft is rotated by the starter torque produced by the resulting power, thereby starting the engine.

While the vehicle is traveling, the lead storage battery is charged by the power produced by a generator mounted on the vehicle which is driven by the engine. The battery is thus charged to make up for the large amount of power consumed in starting the engine.

In a well-known rechargeable lead storage battery, which is a secondary battery, charging and discharging take place owing to the chemical action of an electrolyte and electrodes. Consequently, at discharge, a large amount of current is capable of being discharged in a short period of time, as indicated by the discharge characteristic shown in FIG. 6(a). During charging, however, a current of less than 10 A is supplied over a long period of time to achieve the charging, as indicated by the charge characteristic shown in FIG. 6(b). If a large amount of current were to be supplied, heating and electrode deformation would result.

Accordingly, in vehicles whose users drive only short distances and for short periods of time (as for ordinary commuting), and in vehicles whose users make a large number of starts and stops (as for making deliveries), actual driving time is short while the number of times the engine is started is large. As a result, the electrical power expended by battery discharge during starting cannot be compensated for by sufficient charging, and hence there is the danger that the battery will die, thus making it impossible to start the engine.

A power supply apparatus for automobiles disclosed in the specification of Japanese Utility Model Application Laid-Open (KOKAI) No. 56-146644 includes a series circuit composed of an engine starter and a starter switch, and a series circuit composed of a unidirectional element and a capacitor. The two series circuits are connected in parallel to a DC power source, both ends of the capacitor are connected to a load, and power is supplied to the load.

In this proposed power supply apparatus for automobiles set forth in the above publication, the power supply circuit employs a large-capacity capacitor comprising an electrical double layer capacitor. However, since this large-capacity capacitor is for the load, it is isolated from the starter circuit by a diode during engine start and therefore does not constitute part of the engine starting power supply.

In studies regarding the designing of batteries for automotive vehicles, most emphasis has been placed on the ability to start an engine as a deciding factor of battery capacity. Accordingly, the battery for an automotive vehicle is required to be high in weight and capacity in consideration of the power consumed at during starting of the engine, which demands a large amount of power. On the other hand, since the battery is supplied with power once the engine has been started by the generator for the vehicle which is driven by the engine, a battery of small capacity is thereafter sufficient.

SUMMARY OF THE INVENTION

An object of the present invention is to provide a vehicular power supply apparatus capable of supplying a large amount of current to an engine starter during the starting of an engine.

Another object of the present invention is to provide a vehicular power supply apparatus capable of driving an engine starter, easily even if the capacity of the battery for the vehicle is reduced.

In accordance with the present invention, there is provided a vehicular power supply apparatus for driving an engine starter by electrical power from a battery for an automotive vehicle, comprising a large-capacity capacitor connected to the battery, a starter switch connected to the battery and in parallel with the capacitor, and energizing means for delivering electric charge from the capacitor to the engine starter in response to closure of the starter switch.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

Figure 1:
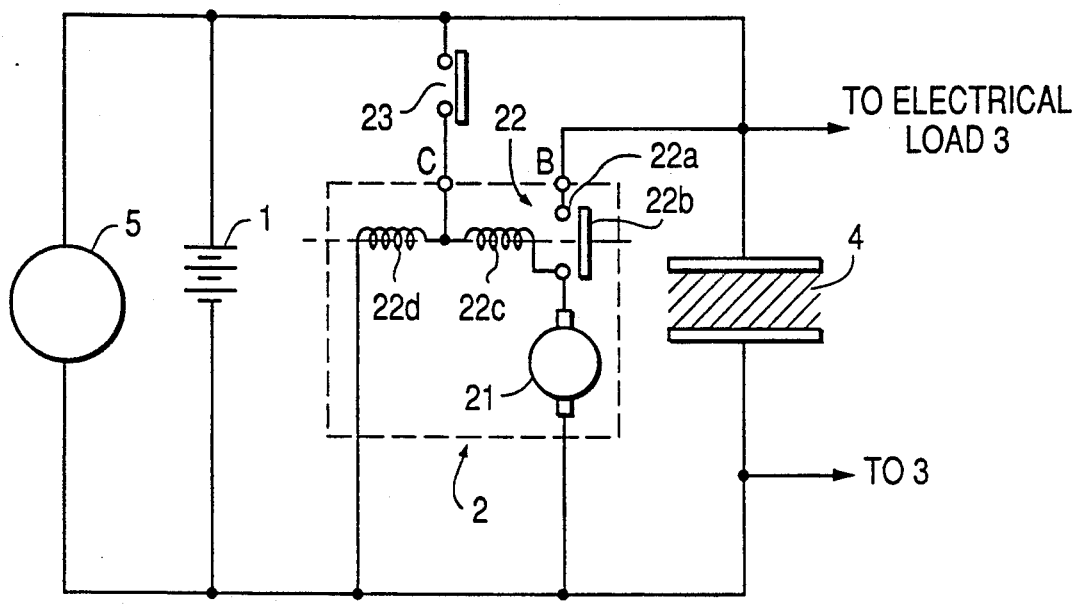
FIG. 1 is a circuit diagram illustrating an embodiment of a vehicular power supply apparatus according to the present invention.

FIG. 1 is a circuit diagram illustrating the construction of an embodiment of the invention.

A battery 1 shown in FIG. 1 is a lead storage battery for an automotive vehicle. The battery 1 serves as the power supply of a starter unit 2 which starts the engine of the vehicle, and it also provides power for an electrical load of the vehicle. The starter unit 2 has a motor 21 engaged with the engine for rotating a crankshaft at engine start, and an electromagnetic relay 22 having main contacts 22a and a movable contact 22b. The arrangement is such that the movable contact 22b which closes the circuit by contacting the main contacts 22a is driven by the electromagnetic attracting force of two types of coils, namely an A coil 22c and a B coil 22d. The terminal on the voltage side of the motor 21 is connected to one of the main contacts 22a and to one end of the A coil 22c, the other end of the A coil 22c is connected to one end of the B coil 22d and to a C terminal of the starter unit 2, and the other main contact 22a is connected to a B terminal of the starter unit 2. The ground terminal of the motor 21 and the other end of the B coil 22d are grounded to the vehicle body. Reference numeral 23 denotes a starter switch connected across the positive terminal of the battery 1 and the C terminal of the starter unit 2. By closing the starter switch 23, the starter unit 2 is actuated so that the engine is started by driving power from the motor 21.

Reference numeral 4 denotes a capacitor having a large capacity 4, for example. Employed as this capacitor a capacitor is having the size of an electrical double layer capacitor used in the back-up power supply of the memory of an electronic device. For example, the capacitor might have a static electric capacitance on the order of 10~150 F. The positive terminal of the capacitor 4 is connected to the B terminal of the starter unit 2, namely the positive terminal side of the battery 1, and the negative terminal of the capacitor 4 is grounded. Thus the capacitor 4 is sufficiently charged at all times by the battery 1.

Reference numeral 5 denotes a well-known generator driven by the engine. The generated power is converted into direct current, which is used to charge the battery 1.

The operation of the embodiment constructed as set forth above will now be described.

When the starter switch 23 is closed during the starting of the engine, the current from the battery 1 flows from the A coil 22c of the electromagnetic relay 22 to the motor 21 via the C terminal of the starter unit 2, and from the C terminal to the B coil 22d, whereby the movable contact 22b is attracted by the electromagnetic attracting force of the two coils to close the main contacts 22a.

Figure 2:
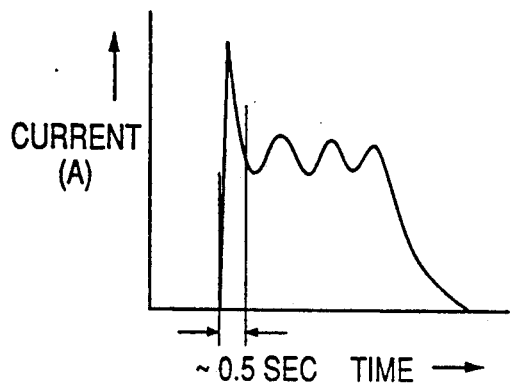
FIG. 2 is a graph showing the relationship between starter current and time during starting of an engine.

Consequently, the charge in the large-capacity capacitor 4 which has been previously charged by the battery 1, and the current from the battery 1 flow into the motor 21. These two large currents cause the motor 21 to turn, which applies a strong driving force to the engaged crankshaft to start the engine. The large current for starting the motor at this time lasts for about 0.5 sec, as shown in the example of FIG. 2. If, by way of example, the amount of charge stored in the battery 1 should diminish to the extent that starting of the engine would be impossible with the current from the battery 1 itself, the large current resulting from the charge stored in the large-capacity capacitor 4 will still drive the motor 21 strongly enough to start the engine.

As for the capacity of the capacitor 4, ordinarily the starter current required when starting a gasoline engine having a displacement of 1.5 l is on the order of 100~200 A, and the time needed to start the engine is several seconds at most. Accordingly, the capacity of the capacitor 4 need have a value that satisfies these requirements.

Figure 3:
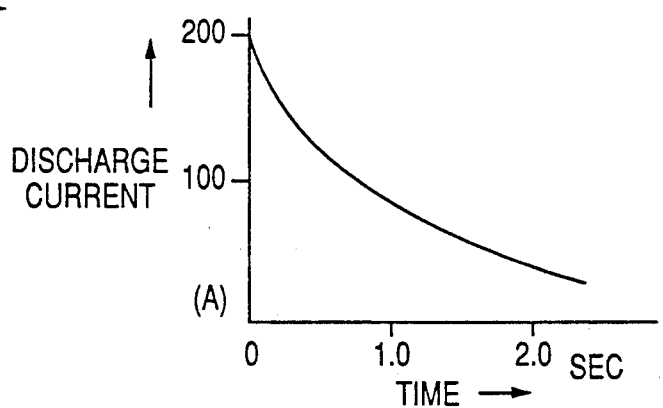
FIG. 3 is a capacitor discharge characteristic diagram.

FIG. 3 shows an example of the discharging characteristic of a capacitor. The discharge equation of an ordinary capacitor is as expressed by the following equation:

$$I = \frac{E}{R} = \frac{Eo}{R} \exp\left(\frac{t}{RC}\right) \qquad (1)$$

where
Eo: capacitor charging voltage
R: load resistance
C: capacitor capacity

The load resistance R is about 0.05 Ω for a vehicle running on gasoline. A discharge time of several seconds will suffice, as set forth above. Therefore, if R.C=5~7 (sec), then C≈100~150 (F).

Thus, the calculations are based on a case where the charge in the capacitor is discharged in several seconds when the starter is actuated. Since a large current is required for 0.5 sec, R.C=0.5 (sec) will hold if the load of the capacitor is limited to this period of time. Therefore, C≈10 (F) will suffice.

In accordance with the present embodiment as set forth above, a large-capacity capacitor 4 capable of storing a large amount of electric charge is attached as part of the power supply of a vehicle. Therefore, even if the amount of charge stored in a battery 1 is constantly small because it is used in a vehicle whose user drives only short distances for short periods of time or in a vehicle whose user makes a large number of starts and stops, the starter can be driven by the charge stored in the large-capacity capacitor 4 at start-up, thus making it possible to start the engine.

Figure 5:
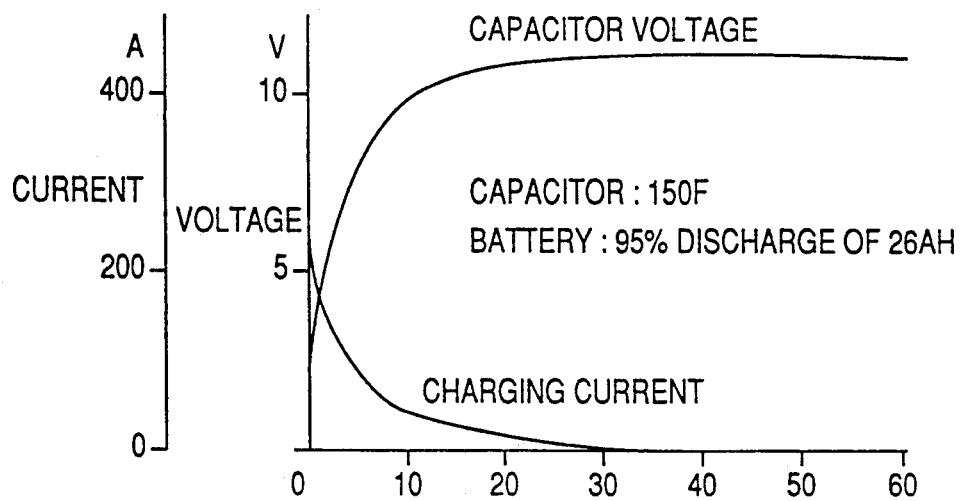
FIG. 5 is a diagram showing the charging characteristic of a large-capacity capacitor.
Figure 6A:
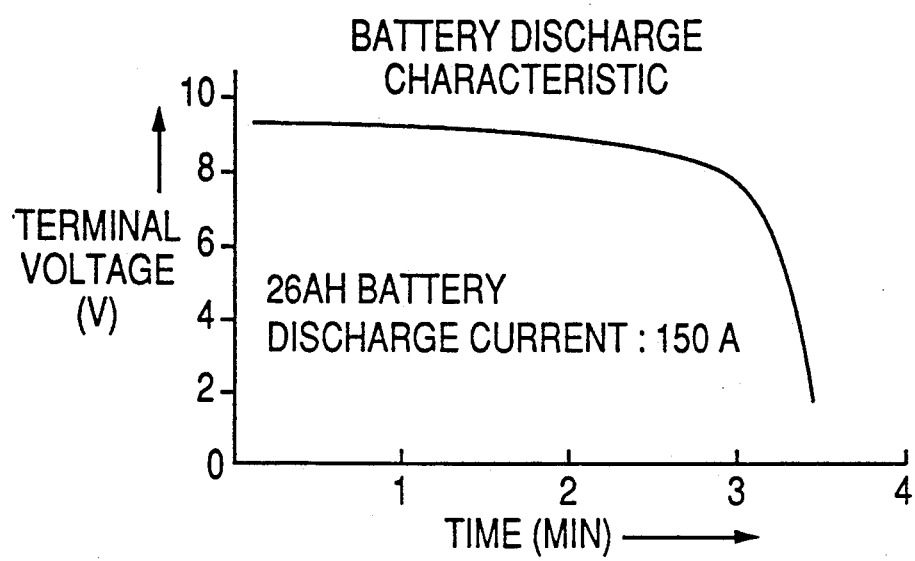
FIGS. 6(a) and 6(b) are diagrams showing examples of charging and discharge characteristics of a lead storage battery.
Figure 6B:
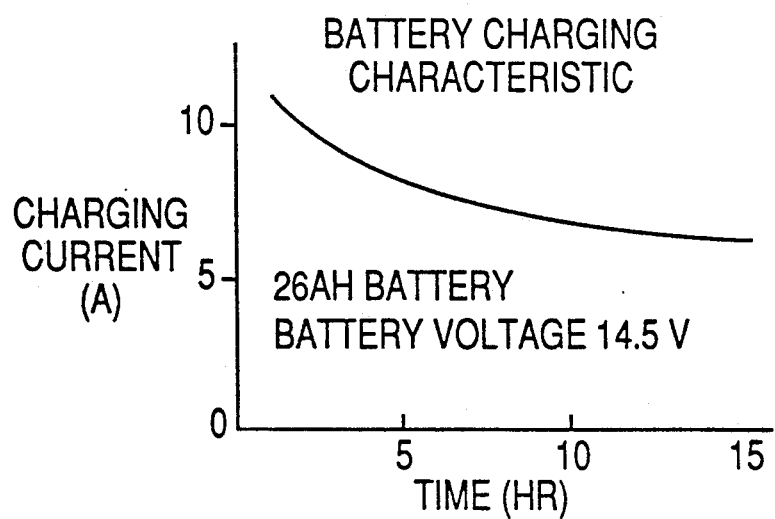

By way of example, FIG. 5 illustrates data obtained when a capacitor 4 having a capacitance of about 150 F is charged by a battery 1 discharged to 95% of its total charge. It will be appreciated that charging of the capacitor 4 is completed in approximately 20 sec, as a result of which starting of the engine can be accomplished sufficiently.

Further, in accordance with the invention, providing the large-capacity capacitor 4 reduces dependence upon the amount of charge in the battery 1 when the engine is started. When a vehicle is being designed, therefore, the capacity of the battery 1 with which the vehicle is to be provided can be made smaller than would be the case with the prior art.

Figure 4:
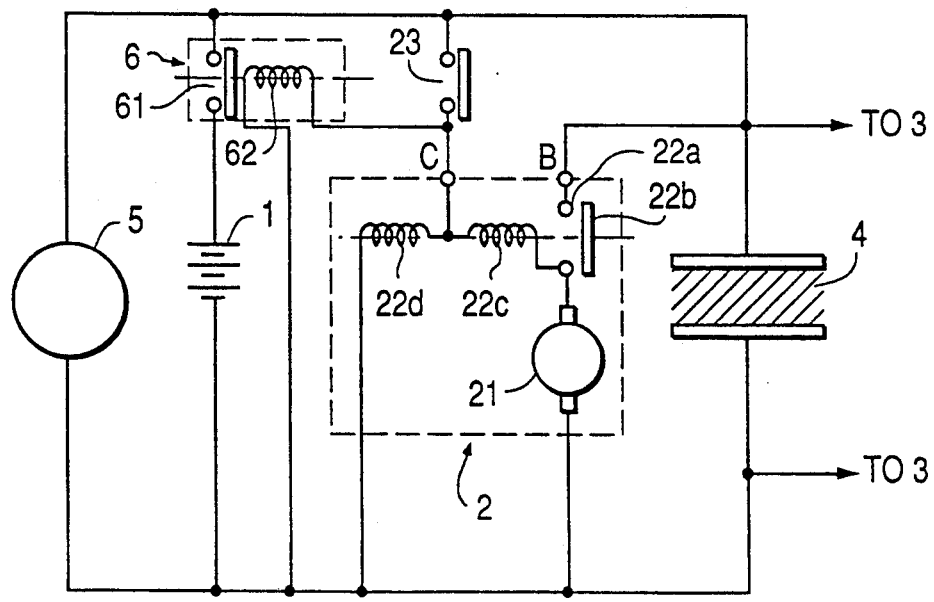
FIG. 4 is a circuit diagram illustrating another embodiment of a vehicular power supply apparatus according to the present invention.

For example, in the case of a passenger car fueled by gasoline, the capacity of the battery 1 used ordinarily is 25~30 AH. If the present invention is applied, however, a capacity of 10 AH will suffice. The following is an example of the dimensions and weight of the battery and capacitor:

Dimensions of 27 AH battery: 227×127×187 mm
Weight: 9.5 kg
Dimensions of 10 AH battery: 147×92×138 mm
Weight: 4.5 kg
Dimensions of 150 F/16 V capacitor: 120×120×140 mm
Weight: 5.5 kg
Dimensions of 10 F/16 V capacitor: 60×60×40 mm
Weight: 0.65 kg FIG. 4 is a circuit diagram illustrating the construction of another embodiment of the present invention, in which portions similar to those shown in FIG. 1 are designated by like reference characters and need not be described again.

In FIG. 4, reference numeral 6 denotes a relay connected across the positive terminal of battery 1 and the positive side of the vehicular power supply apparatus. Contacts 61 of the relay 6 are normally closed to connect the positive terminal of the battery 1 to the position side of the vehicular power supply apparatus. The relay 6 has a coil 62 which, by being energized, causes the contacts 61 to open. The coil 62 is connected across the C terminal of the starter unit 2 and ground.

With the embodiment thus constructed as shown in FIG. 4, closing the starter switch 23 actuates the starter unit 2 so that the motor 21 is driven by the charge accumulated in the large-capacity capacitor 4, just as in the first embodiment. By closing the starter switch 23 however, the relay 6 is opened so that the positive terminal of the battery 1 is disconnected from the positive side of the vehicular power supply apparatus thereby protecting against consumption of charge accumulated in the battery 1. Furthermore, even though power is not supplied to the positive side of the vehicular power supply apparatus from the battery 1 due to opening of the relay 6, the coil 62 of the relay 6 and the B coil 22d of the electromagnetic relay 22 are supplied with current from the large-capacity capacitor 4, as a result of which the attracting action of both coils is maintained.

As many apparently widely different embodiments of the present invention can be made without departing from the spirit and scope thereof, it is to be understood that the invention is not limited to the specific embodiments thereof except as defined in the appended claims.

What we claim is:

1. A vehicular power supply apparatus for driving an engine starter by electrical power, said vehicular power supply apparatus being operatively connected to a battery for providing electrical power, said apparatus comprising:

a large-capacity capacitor operatively connected to the battery;

a starter switch operatively connected to the battery and in parallel with said large-capacity capacitor; and energizing means for delivering electric charge from said large-capacity capacitor to the engine starter in response to closure of said starter switch, said energizing means including a first electromagnetic relay including:

a coil having first and second ends, the first end being operatively connected to said starter switch;

first and second main contacts, the first main contact being operatively connected to said large-capacity capacitor and the second main contact being operatively connected to the engine starter; and a movable contact for connecting said first and second main contacts by energization of said coil.

2. The apparatus according to claim 1, wherein the second end of said coil is operatively connected to said second main contact.

3. The apparatus according to claim 1, wherein said large-capacity capacitor is connected in parallel with the battery.

4. The apparatus according to claim 1, further comprising:

normally closed contacts operatively connecting the battery to the engine starter, and a second electromagnetic relay operatively connected to said first electromagnetic relay for opening said normally closed contacts.

5. The apparatus according to claim 4, wherein said large-capacity capacitor is connected in parallel with the battery.

6. A method for driving a motor with a vehicular power supply apparatus coupled to a battery and including a large-capacity capacitor, a starter switch having first and second positions, and a starter motor said method comprising the steps of:

(a) switching the starter switch form the first position to the second position for starting of the motor;

(b) supplying electric charge from the large-capacity capacitor to the starter motor when the starter switch is in the second position;

(c) disconnecting the battery from the starter motor and the large-capacity capacitor when the starter switch is in the second position; and (d) charging the large-capacity capacitor using the battery when the starter switch is in the first position.

7. A vehicular power supply apparatus for driving an engine starter by electrical power, said vehicular power supply apparatus being operatively connected to a battery for providing electrical power, said apparatus comprising:

a large-capacity capacitor operatively connected to the battery, said large-capacity capacitor being an electrical double layer capacitor;

a starter switch operatively connected to the battery and in parallel with said large-capacity capacitor; and energizing means for delivering electric charge form said large-capacity capacitor to the engine starter in response to closure of said starter switch.

* * * * *

UNITED STATES PATENT AND TRADEMARK OFFICE
CERTIFICATE OF CORRECTION

PATENT NO. : 5,256,956

DATED : OCTOBER 26, 1993

INVENTOR(S) : YOSHINOBU TSUCHIYA ET AL.

It is certified that error appears in the above-identified patent and that said Letters Patent is hereby corrected as shown below:

```
Col. 2,   line  8,  "at" should be deleted;
          line 23,  "starter," should be --starter--.

Col. 3,   line 21,  "capacity 4, for example." should be
                        --capacity--;
          line 22,  "tor a capactiro is having" should be
                        --tor 4, for example, is a capacitor
                        having--;
          line 47,  "4" should be --4,--.

Col. 6,   line 48,  "form" should be --from--.
```

Signed and Sealed this

Fourteenth Day of June, 1994

Attest:

BRUCE LEHMAN

*Attesting Officer*   Commissioner of Patents and Trademarks